United States Patent
Haruna et al.

(10) Patent No.: US 9,218,786 B2
(45) Date of Patent: Dec. 22, 2015

(54) IMAGE DISPLAY DEVICE

(71) Applicant: Hitachi Media Electronics Co., Ltd., Yokohama, Kanagawa (JP)

(72) Inventors: Fumio Haruna, Yokohama (JP); Tsutomu Kuroiwa, Yokohama (JP); Yuya Ogi, Tokyo (JP)

(73) Assignee: HITACHI-LG DATA STORAGE, INC., Tokyo (JP)

( * ) Notice: Subject to any disclaimer, the term of this patent is extended or adjusted under 35 U.S.C. 154(b) by 109 days.

(21) Appl. No.: 14/087,126

(22) Filed: Nov. 22, 2013

(65) Prior Publication Data
US 2014/0285536 A1  Sep. 25, 2014

(30) Foreign Application Priority Data

Mar. 22, 2013 (JP) ................................. 2013-059486

(51) Int. Cl.
*G09G 5/10* (2006.01)
*G02B 26/08* (2006.01)
*H04N 9/31* (2006.01)

(52) U.S. Cl.
CPC .............. *G09G 5/10* (2013.01); *G02B 26/0816* (2013.01); *H04N 9/3129* (2013.01); *H04N 9/3144* (2013.01); *H04N 9/3182* (2013.01); *H04N 9/3194* (2013.01)

(58) Field of Classification Search
CPC ........... G09G 5/10; G09G 5/02; G09G 3/002; G02B 26/08; G02B 26/0833; G02B 26/0841; G02B 5/282; G02B 6/3598
See application file for complete search history.

(56) References Cited

U.S. PATENT DOCUMENTS

| | | | |
|---|---|---|---|
| 2002/0164157 A1* | 11/2002 | Hori et al. | 386/127 |
| 2006/0022214 A1* | 2/2006 | Morgan et al. | 257/99 |
| 2008/0130693 A1* | 6/2008 | Mizusako et al. | 372/28 |
| 2010/0176310 A1* | 7/2010 | Moriya et al. | 250/493.1 |
| 2011/0242496 A1* | 10/2011 | Kimoto et al. | 353/31 |
| 2012/0140185 A1* | 6/2012 | Masuda | 353/31 |
| 2012/0249976 A1* | 10/2012 | Shibasaki et al. | 353/52 |
| 2014/0078474 A1* | 3/2014 | Nakao et al. | 353/33 |
| 2014/0253527 A1* | 9/2014 | Ogi et al. | 345/207 |
| 2014/0285536 A1* | 9/2014 | Haruna et al. | 345/690 |

FOREIGN PATENT DOCUMENTS

| | | |
|---|---|---|
| JP | 2006-343397 | 12/2006 |
| JP | 2009-15125 | 1/2009 |

* cited by examiner

*Primary Examiner* — Ricardo L Osorio
(74) *Attorney, Agent, or Firm* — Baker Botts L.L.P.

(57) ABSTRACT

A change in the white balance caused due to the temperature is reduced in an image display device using MEMS and a laser light source. An image processing unit of the device superposes a signal based on a first measured value of a light quantity at a first temperature on a image signal to be supplied to the laser light source. An amplification factor of the light source drive unit is changed so that a second measured value at a second temperature comes close to the first measured value at the first temperature as a target value based on the second measured value at which the light quantity of light generated at the laser light source is measured at the second temperature different from the first temperature on the signal based on the first measured value.

9 Claims, 7 Drawing Sheets

IMAGE DISPLAY DEVICE

INCORPORATION BY REFERENCE

This application relates to and claims priority from Japanese Patent Application No. 2013-059486 filed on Mar. 22, 2013, the entire disclosure of which is incorporated herein by reference.

BACKGROUND OF THE INVENTION (1) Field of the Invention

The present invention relates to an image display device using MEMS (Micro Electro Mechanical Systems).

(2) Description of the Related Art

In recent years, as one of image display devices, a small-sized projection projector is popular, which uses MEMS and a semiconductor laser light source. For example, Japanese Patent Application Laid-Open No. 2006-343397 discloses a projector, in which images are projected by scanning a two-axis MEMS mirror horizontally and vertically and by simultaneously modulating a laser light source.

However, a semiconductor laser for use in a small-sized projection projector has a problem in that the white balance of a display screen is changed because the light quantity and forward current characteristics of the semiconductor laser are changed depending on the temperature. Japanese Patent Application Laid-Open No. 2009-15125 discloses a method for compensating a temperature change in a semiconductor laser.

SUMMARY OF THE INVENTION

However, the technique disclosed in Japanese Patent Application Laid-Open No. 2009-15125 does not consider an image display device like a projection projector and has a problem in that it is difficult to adjust the white balance.

Moreover, the semiconductor laser is changed in the forward current characteristics as well as in the wavelength of generating a laser beam depending on the temperature. Thus, even though the light quantity can be made constant regardless of a temperature change, it is likely to shift the white balance.

It is an object of the present invention to provide a laser projection projector as an image display device that reduces a change in the white balance caused due to a temperature change.

In order to solve the problem, the present invention is an image display device that externally projects generated light and displays an image, the image display device including: a light source configured to generate the light; a light source drive unit configured to drive the light source and control a light quantity of the light; a reflecting mirror configured to reflect light generated at the light source and externally project the light, a direction to reflect the light being movable; a reflecting mirror drive unit configured to drive the reflecting mirror and control the direction to reflect the light; an image processing unit configured to process a first image signal inputted to the image display device, supply and control a second image signal for the image externally displayed to the light source drive unit, and supply a synchronization signal for the second image signal to the reflecting mirror drive unit; an optical sensor configured to measure a light quantity of light generated at the light source and supply a measured value to the image processing unit; and a temperature sensor configured to measure a temperature of the light source and supply a measured value to the image processing unit. The image processing unit superposes a signal based on a first measured value of the light quantity measured at the optical sensor on the second image signal to be supplied to the light source drive unit in a state in which the light source drive unit is set to drive the light source at a set first temperature. The image processing unit controls the light source drive unit so that a second measured value at a second temperature comes close to the first measured value at the first temperature as a target value based on the second measured value at which a light quantity of light generated at the light source is measured at the optical sensor at the second temperature different from the first temperature on the signal based on the first measured value.

According to the present invention, there is an effect to provide a laser projection projector as an image display device that reduces a change in the white balance caused due to a temperature change.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF THE EMBODIMENT

Figure 1:
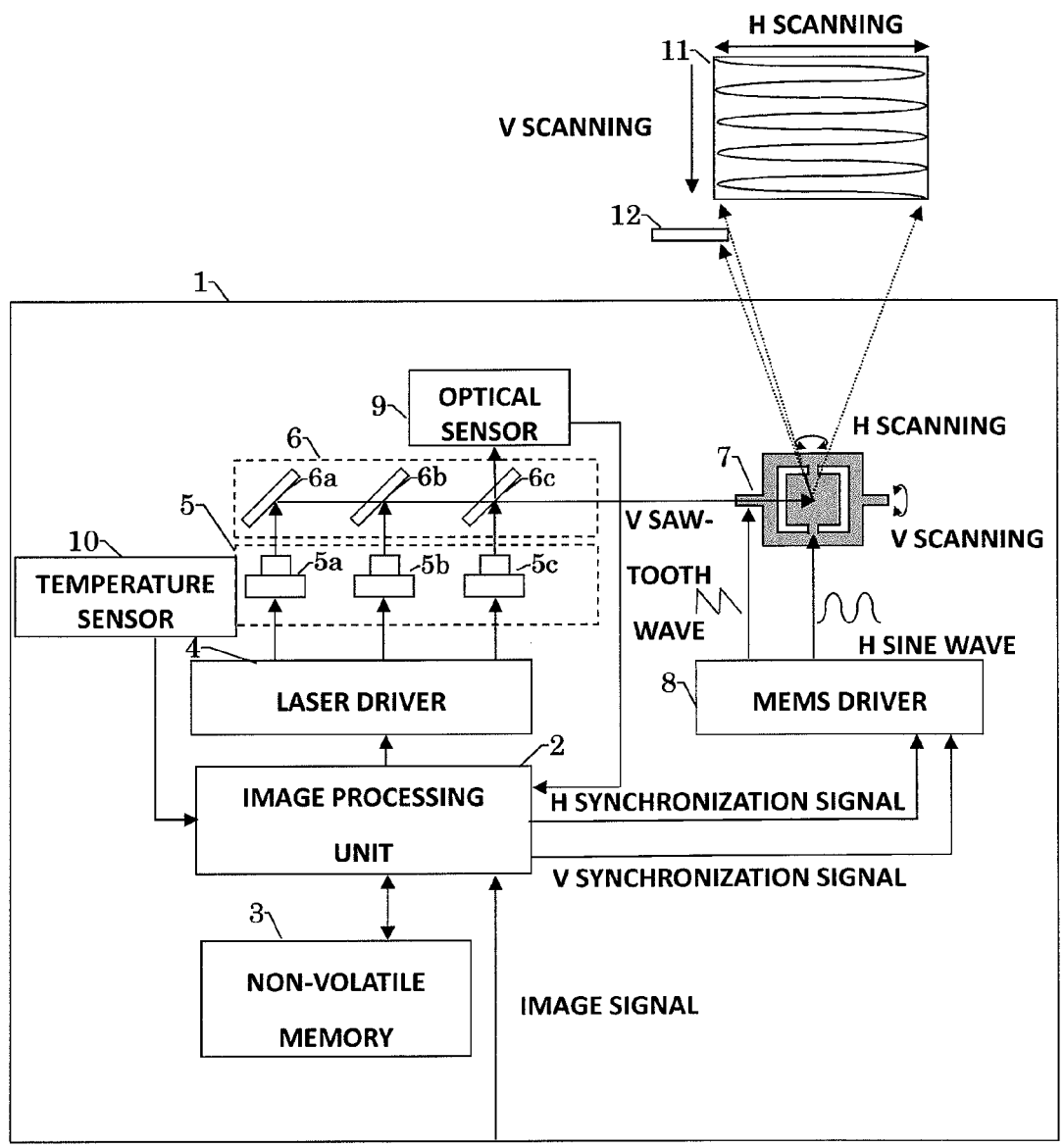
FIG. 1 is a block diagram of the basic configuration of a projection projector according to an embodiment.

In the following, an embodiment of the present invention will be described in detail with reference to the drawings. It is noted that in all the drawings for explaining the embodiment, the same components are designated the same reference numerals and signs in principle, and the overlapping description is omitted.

FIG. 1 is a block diagram of an exemplary configuration of a projection projector using MEMS according to the embodiment. A projection projector 1 includes an image processing unit 2, a non-volatile memory 3, a laser driver 4, a laser light source 5, a reflecting mirror 6, a MEMS 7, a MEMS driver 8, an optical sensor 9, a temperature sensor 10, and a light shielding plate 12. It is noted that a display image 11 is an image displayed by externally projecting a laser beam from the projection projector 1. The image processing unit 2 applies various schemes of correction to an externally inputted image signal to generate an image signal, and generates a horizontal synchronization signal and a vertical synchronization signal in synchronization with the generated image signal. Moreover, the image processing unit 2 controls the laser driver 4 according to the light quantity acquired from the optical sensor 9 and the temperature of the laser light source 5 acquired from the temperature sensor 10, and adjusts the white balance to be constant. The detail will be described later. Here, various schemes of correction performed at the image processing unit 2 mean that the image processing unit 2 corrects image distortion caused due to scanning performed by the MEMS 7, for example. More specifically, image distortion is caused due to the difference in a relative angle between the projection projector 1 and the projection surface and to the optical axial displacement between the laser light source 5 and the MEMS 7, for example. The laser driver 4 receives the image signal outputted from the image processing unit 2, and modulates a current value to be supplied to the laser light source 5 based on the data values of the image signal. For example, in the case where a high gray scale image is displayed, a current flow rate to the laser light source 5 is increased, whereas in the case where a low gray scale image is displayed, a current flow rate to the laser light source 5 is reduced.

The laser light source 5 uses three laser light sources 5a, 5b, and 5c for three red, green, and blue primary colors, for example, individually modulates red, green, and blue image signals, and outputs red, green, and blue laser beams. The red, green, and blue laser beams are combined at the reflecting mirror 6. It is noted that the reflecting mirror 6 includes a special optical element that reflects light at a specific wavelength and transmits the other wavelengths, which is generally called a dichroic mirror having the following characteristics. For example, a reflecting mirror 6a reflects all the laser beams. A reflecting mirror 6b transmits the laser beam from the laser light source 5a, and reflects the laser beam from the laser light source 5b. A reflecting mirror 6c transmits the laser beams from the laser light source 5a and 5b, and reflects the laser beam from the laser light source 5c. Thus, the red, green, and blue laser beams can be combined in a single beam. The combined laser beam enters the MEMS 7. One of elements included in the MEMS 7 is a two-axis rotation mechanism, and a center mirror unit can be vibrated horizontally and vertically using the two-axis rotation mechanism. The MEMS driver 8 controls the vibrations of the mirror. It is noted that in FIG. 1, an example of the MEMS 7 is a two-axis MEMS device. However, the MEMS 7 can be configured by combining two single-axis MEMS devices.

The MEMS driver 8 generates a sine wave in synchronization with the horizontal synchronization signal from the image processing unit 2, generates a saw-tooth wave in synchronization with the vertical synchronization signal, and then drives the MEMS 7. The MEMS 7 receives the sine wave to perform sine wave motion in the horizontal direction, and at the same time, the MEMS 7 receives the saw-tooth wave to perform constant velocity motion in one direction of the vertical direction. Thus, a laser beam is scanned in a trace as on the display image 11 in FIG. 1, the scanning is synchronized with the modulation operation conducted by the laser driver 4, and then the inputted image is projected.

Here, the optical sensor 9 is disposed so as to detect the leaked light of the red, green, and blue laser beams combined at the reflecting mirror 6. Namely, the optical sensor 9 is disposed on the opposite side of the reflecting mirror 6c from the laser light source 5c. The reflecting mirror 6c has the characteristics of transmitting the laser beams from the laser light source 5a and 5b and reflecting the laser beam from the laser light source 5c. However, it is difficult to provide the characteristics of transmitting or reflecting the laser beams at 100 percent for the reflecting mirror 6c. Generally, the reflecting mirror 6c reflects the laser beams from the laser light source 5a and 5b and transmits the laser beam from the laser light source 5c at a few percent. Therefore, the optical sensor 9 is disposed at the position illustrated in FIG. 1, so that the reflecting mirror 6c can transmit a few percent of the laser beam from the laser light source 5c, and can reflect a few percent of the laser beams from the laser light source 5a and 5b, and the laser beams enter the optical sensor 9. The optical sensor 9 measures the light quantities of the incident laser beams, and outputs the values to the image processing unit 2. It is noted that for the optical sensor 9, a photodiode or an OEIC (Opto-Electronic Integrated Circuit) for an optical disk drive can be generally used.

Moreover, for measuring the temperature of the laser light source 5, the temperature sensor 10 is in as close contact as possible with the location of a structure mechanism (not illustrated) on which the laser light sources 5a, 5b, and 5c are fixed, and the temperature sensor 10 measures the temperature of the laser light source 5. For the temperature sensor 10, a thermistor element can be used.

Next, the white balance control performed by the image processing unit 2 will be described with reference to FIGS. 2 and 3.

Figure 2:
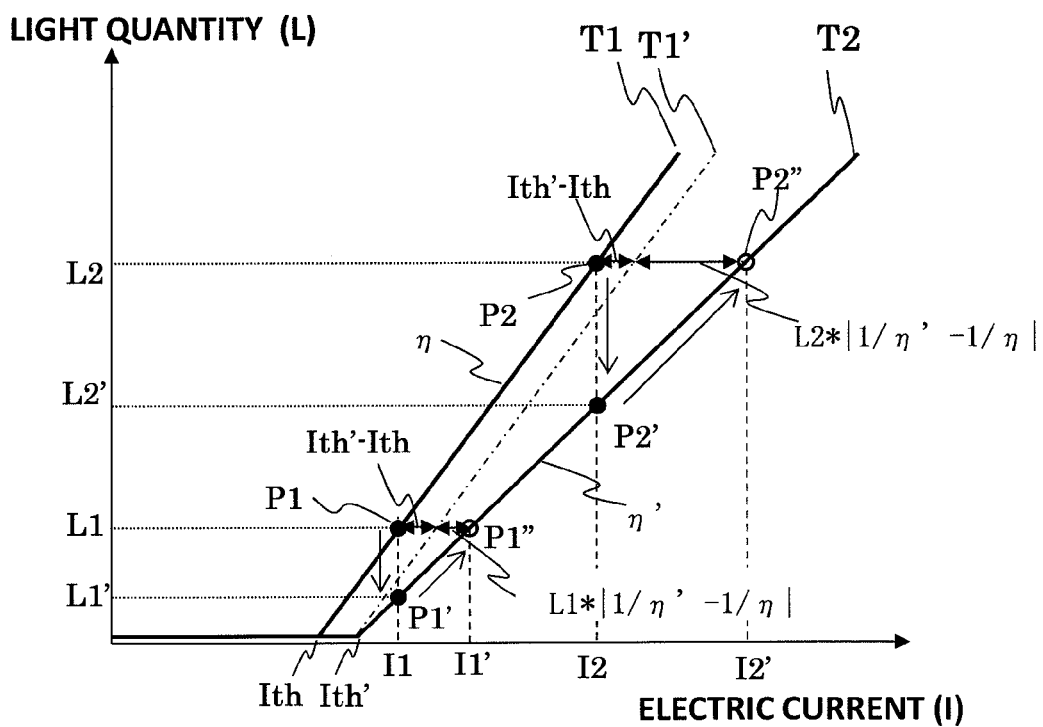
FIG. 2 is a characteristic diagram of the light quantity of a monochrome light source and the forward current characteristics according to the embodiment.

FIG. 2 is the characteristics of the light quantity (on the vertical axis) and the forward current (on the horizontal axis) of a laser, illustrating that the characteristics of the light quantity and the forward current are changed depending on a temperature change.

As illustrated in FIG. 2, the light quantity and the forward current characteristics of a semiconductor laser are changed depending on a temperature change. In FIG. 2, there are two types of temperature conditions T1 and T2 in the relationship of expression T1<T2. As illustrated in FIG. 2, generally, such a tendency is observed in which when the temperature is increased, the threshold current of the forward current is increased (Ith<Ith' in FIG. 2), and the slope efficiency, which is a slope, is reduced (in FIG. 2, η>η'). Therefore, in the case where the drive current is constant, the temperature is changed and then the light quantity is also changed.

For example, in the current characteristics under the temperature condition T1, a light quantity L1 is at a point P1 at a current I1, and a light quantity L2 is at a point P2 at a current I2. Under the temperature condition T2, the light quantity L1 is at a point P1' at the current I1, and the light quantity L2 is at a point P2' at the current I2. The light quantities L1 and L2 are decreased even though the same electric current is carried.

Moreover, since the variations in the threshold and the slope efficiency are different in red, green, and blue laser beams, the brightness is changed as well as the white balance is changed when the temperature is changed.

Therefore, the light quantities L1 and L2 at the points P1 and P2 at the currents I1 and I2 under the condition T1 are measured, and the feedback is controlled in such a way that the light quantities L1 and L2 are constant all the time. Generally, such control is called APC (Auto Power Control). When the light quantities of red, green, and blue laser beams are constant, the white balance stays the same as well.

More specifically, first, the optical sensor 9 measures the light quantities L1 and L2 at two points (P1 and P2) under the temperature condition T1, and the image processing unit 2 approximates a straight line from the two points, and calculates a slope efficiency η of the approximated straight line and the point Ith intersecting the X-axis at which the light quantity of the approximated straight line is zero. Similarly, the optical sensor 9 measures light quantities L1' and L2' at two points (P1' and P2') under the condition T2, and calculates a slope efficiency η' and a point Ith'. The slope efficiencies η and η' the points Ith and Ith' are changed depending on a temperature change. The slope efficiency η and the point Ith in the first initial states are stored on the non-volatile memory 3, and a laser drive current is corrected in such a way that the light quantity is constant based on the slope efficiency η' and the point Ith' after the temperature is changed.

Namely, in order that the light quantity is constant, the current value is increased to a current value I1' in such a way that the light quantity at the point P1' is increased from the light quantity L1' to the light quantity L1 for moving at a point P1". The current value is increased to a current value I2' in such way that the light quantity at the point P2' is increased from the light quantity L2' to the light quantity L2 for moving at a point P2". A calculation method in which the current value I1 is moved to the current value I1' and the current value I2 is moved to the current value I2' is performed, in which first, the variation (Ith'−Ith) between the threshold currents is added as an offset to the current values I1 and I2 as an alternate long and short dash line T1' as illustrated in FIG. 2, and the variation of the slope efficiency is added to the current values I1 and I2. Although the calculation process in the midway point of the variation of the slope efficiency is omitted because the calculation process is a simple linear function, the calculated results are L1×|1/η'−1/η| at the point P1" and L2×|1/η'−1/η| at the point P2". It is noted that the reason why the calculated results are written in the absolute values is that in the case where the temperature conditions are T1>T2, such tendencies are observed in which the forward current characteristic under the condition T2 is smaller at the point Ith than under the condition T1 and the slope efficiency η, which is a slope, is increased, causing (1/η'−1/η) to be a negative value.

Figure 3:
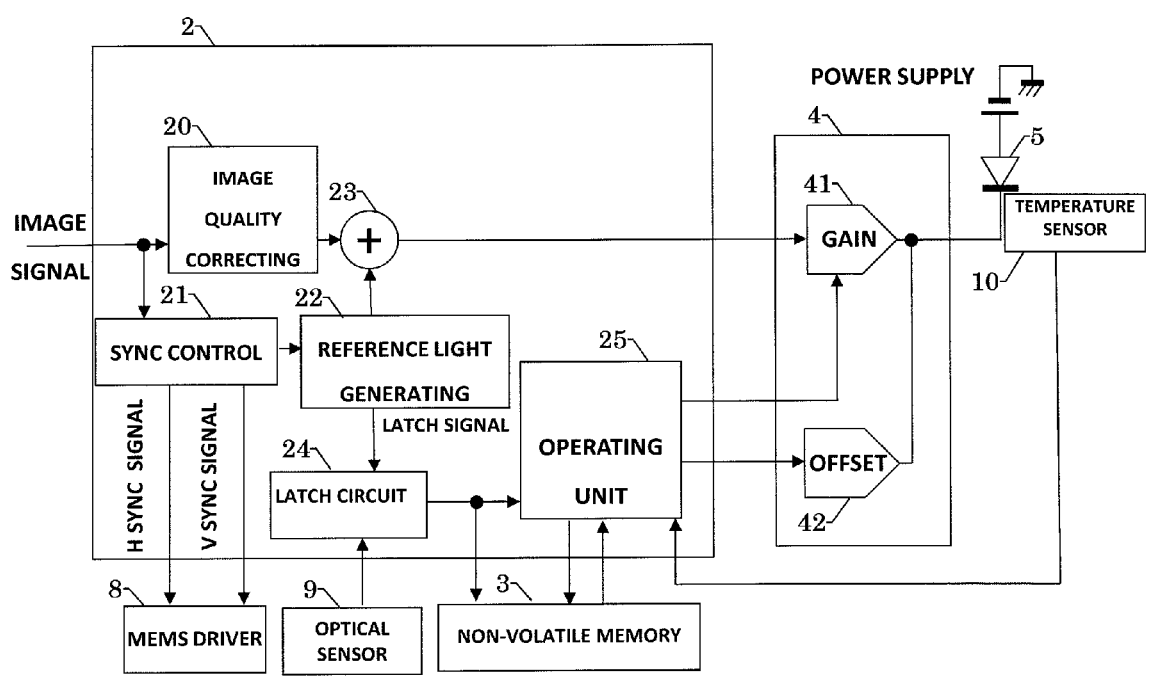
FIG. 3 is a block diagram of the internal configuration of an image processing unit according to the embodiment.

FIG. 3 is a block diagram of the internal configuration of the image processing unit 2. The image processing unit 2 corrects the laser drive current.

The image processing unit 2 first subjects a image signal to general image quality correcting processes such as contrast adjustment, gamma correction, and image distortion correction, for example, at an image quality correcting unit 20. A synchronization processing unit 21 separates horizontal and vertical synchronization signals from the image signal, and supplies the horizontal and vertical synchronization signals to a reference light generating unit 22 and the MEMS driver 8. It is noted that in the case where the horizontal and vertical synchronization signals are originally separated from the image signal and inputted to the image processing unit 2, the synchronization processing unit 21 has simply a separation function. However, in the case where the image signal is inputted as a small amplitude differential signal as by LVDS (Low Voltage Differential Signaling), and the synchronization signals are superposed on another image signal, for example, and then transmitted, it is necessary to convert the differential signal into a parallel signal at CMOS level and to further separate the synchronization signals from the image signal.

The reference light generating unit 22 is a timing and reference light level generation circuit that superposes, on the vertical blanking period of the image signal, signals expressing the light quantities of reference light, which are light quantities at the points P1 and P2 on the currents I1 and I2 at the temperature T1 in FIG. 2. Here, for example, suppose that a signal expressing the light quantity of reference light includes the level corresponding to the image level of an input image.

Figure 4:
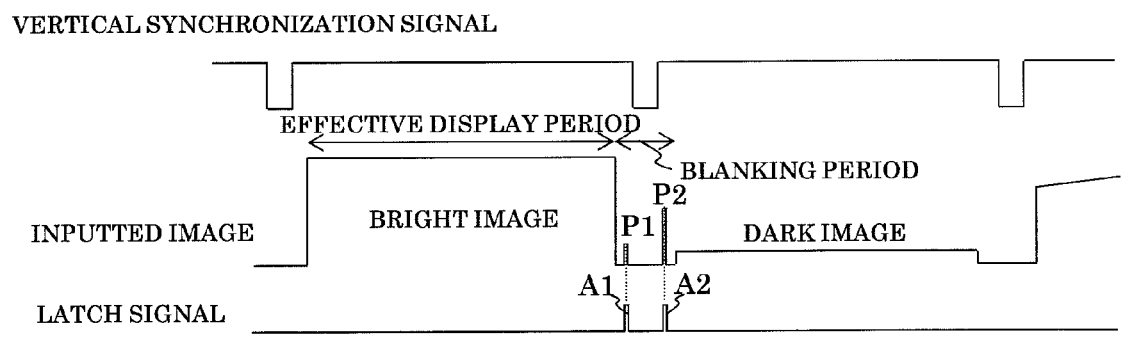
FIG. 4 is a timing chart of the operation of the image processing unit according to the embodiment.

FIG. 4 is a timing chart of the operation of the image processing unit 2 according to the embodiment.

Figure 5:
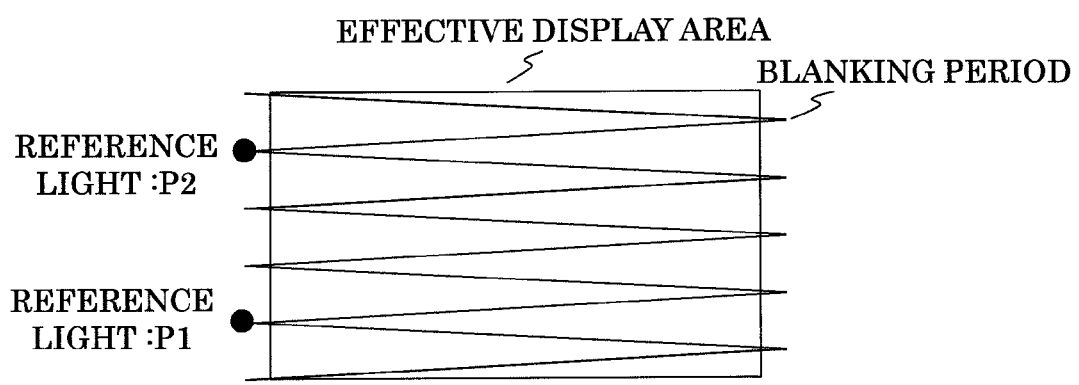
FIG. 5 is an illustration of the display positions of reference light according to the embodiment.

FIG. 5 is an illustration of the display positions of reference light according to the embodiment. FIGS. 4 and 5 illustrate the timing of superposing a signal expressing the light quantity of reference light on the vertical blanking period of the image signal.

As illustrated in an inputted image signal waveform in FIG. 4, points P1 and P2 at which a signal expressing the light quantity of reference light is superposed are located in the vertical blanking period, not in the effective display period. This is because when a signal is superposed in the effective display period, a bright reference light is observed in a dark image, for example, and the image quality is degraded. Moreover, also in the case where a signal is superposed in the vertical blanking period, the timing of superposing the signal is adjusted in such a way that the reference light is emitted when the laser beam comes at the left end or the right end in the vertical blanking period as illustrated in FIG. 5. Furthermore, the horizontal direction of the image signal is reduced at the image processing unit 2 in such a way that the timing is out at which the reference light is superposed on the display area in the effective display period, so that the reference light no longer comes in the effective display area. In addition, the positions of the reference light are physically shielded using the light shielding plate 12 illustrated in FIG. 1 on the emission side of the MEMS 7, so that the reference light may be made invisible.

An adder 23 adds or switches a reference signal to the image signal at the timing and the level at which the reference signal is generated. A latch circuit 24 samples the output of the optical sensor 9 at the timing of a latch signal generated at the reference light generating unit 22 (A1 and A2 in FIG. 4), and stores the sampled outputs on the non-volatile memory 3. In the case where the output of the optical sensor 9 is an analog output, the latch circuit 24 has an analog-to-digital (AD) conversion function in which the latch circuit 24 converts the analog output of the optical sensor 9 into a digital signal, and stores the digital signal on the non-volatile memory 3. In the case where the output of the optical sensor 9 corresponds to the digital output, the latch circuit 24 inquires the optical sensor 9 about the digital output at the timing of A1 and A2 in FIG. 4, temporarily takes in data, and stores the data on the non-volatile memory 3. An operating unit 25 operates the variation (Ith'−Ith) between the threshold currents and the variation of the slope efficiencies (L1×|1/η'−1/η|, L2×|1/η'−1/η|) described in FIG. 2 based on the reference light data stored on the non-volatile memory 3, the light quantities at P1 and P2 measured at the optical sensor 9, and the temperature of the laser light source 5 measured at the temperature sensor 10, and controls a gain circuit 41 and an offset circuit 42 in the laser driver 4. More specifically, the gain circuit 41 is controlled using the variation of the slope efficiency, and the offset circuit 42 is controlled using the variation of the threshold current. It is noted that a period in which the reference signal is superposed may generally range from about a few 10 μs to a few 100 μs in consideration of the response time at the optical sensor 9 and the AD conversion time at the latch circuit 24.

Next, a method for correcting laser wavelength fluctuations caused due to the temperature will be described.

Figure 6:
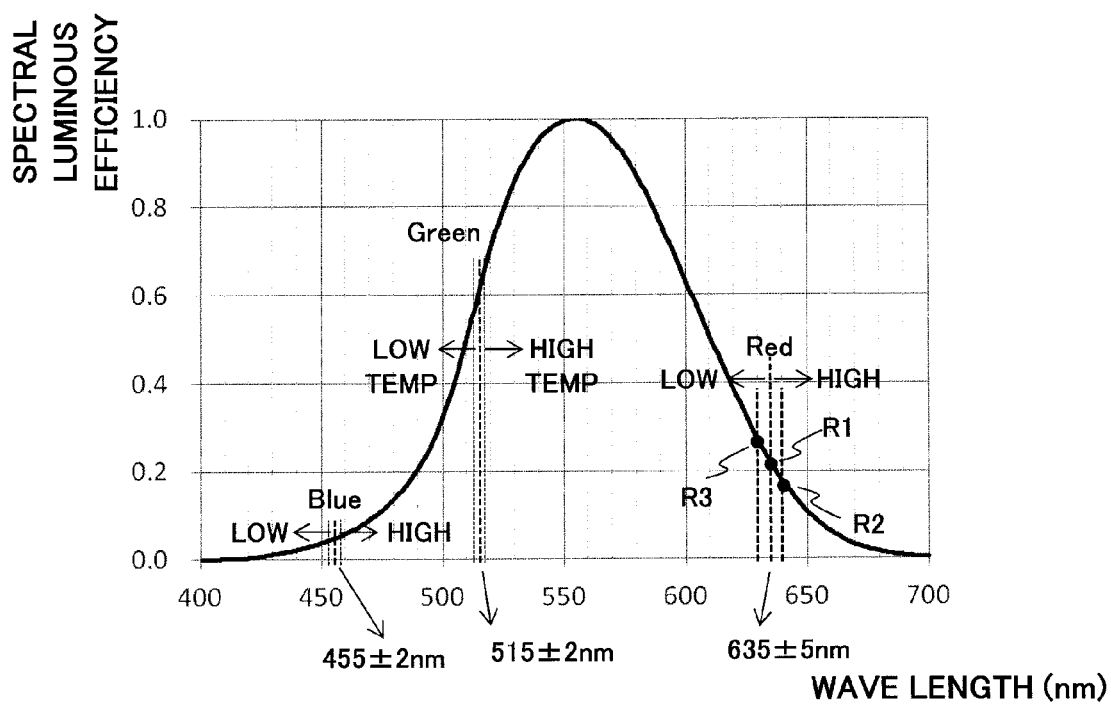
FIG. 6 is a characteristic diagram of the characteristics of the spectral luminous efficiency and the temperature according to the embodiment.

FIG. 6 is a characteristic diagram of the characteristics of the spectral luminous efficiency and the temperature in the embodiment.

The spectral luminous efficiency expresses the strength of human eyes to sense the brightness of the wavelengths of light standardized by Commission Internationale de l'Eclairage (CIE), in which the strength is expressed by numbers below one in such a way that human eyes most strongly sense light near a wavelength of 555 nm, the strength is set to "1", and the degrees of sensing the brightness of the other wavelengths are expressed in ratios to "1". The distribution has the characteristics resembled to the Gaussian distribution. For example, suppose that the green wavelength is a wavelength of 515 nm, the spectral luminous efficiency at the wavelength is defined as 0.6082. Suppose that the red wavelength is a wavelength of 635 nm, the spectral luminous efficiency at the wavelength is defined as 0.217. Suppose that the blue wavelength is a wavelength of 455 nm, the spectral luminous efficiency at the wavelength is defined as 0.048.

On the other hand, the laser light source has the characteristics in which the wavelength of generating a laser beam fluctuates depending on the temperature. Generally, fluctuations in the red laser are the largest, which are about 0.2 nm/° C. Fluctuations occur in the green and blue lasers, which are not so large as in the red laser. Moreover, the wavelengths of all of red, green, and blue laser beams are shifted on the long wavelength side, when the temperatures of the red, green, and blue lasers are at a high temperature, whereas the wavelengths of red, green, and blue laser beams are shifted on the short wavelength side when the temperatures of the red, green, and blue lasers are at a low temperature. Namely, when the range of the operation temperature of the laser is set at a temperature ranging from a temperature of 0° C. to a temperature of 50° C., in the case of the red laser, the wavelength fluctuates from a wavelength of 630 nm at a temperature of 0° C. to a wavelength of 640 nm at a temperature of 50° C. Suppose that fluctuations in the green and blue lasers are about a half of the variation of the red laser, the wavelength is varied from a wavelength of 513 nm at a temperature of 0° C. to a wavelength of 517 nm at a temperature of 50° C., and the wavelength of the blue laser is varied from a wavelength of 453 nm at a temperature of 0° C. to a wavelength of 457 nm at a temperature of 50° C.

Therefore, in the case of the red laser, the spectral luminous efficiency fluctuates from 0.265 at a temperature of 0° C. (R3 in FIG. 6) to 0.175 at a temperature of 50° C. (R2 in FIG. 6), and the brightness fluctuates as large as about 20% with respect to 0.217 in the center (R1 in FIG. 6). Similarly, in the case of the green laser, the spectral luminous efficiency fluctuates from 0.5658 at a temperature of 0° C. to 0.6501 at a temperature of 50° C., which is fluctuations of about 7% with respect to 0.6082 in the center. In the case of the blue laser, the spectral luminous efficiency fluctuates from 0.0437 at a temperature of 0° C. to 0.0527 at a temperature of 50° C., which is fluctuations of about 10% with respect to 0.048 in the center.

Since the fluctuations above are fluctuations in the wavelength and not fluctuations in the light quantity, it is difficult to detect the changes at the optical sensor 9. Namely, the output of the optical sensor 9 such as a photodiode has the wavelength dependence more or less, which is not changed so much caused due to wavelength fluctuations in a wavelength of about 10 nm. Moreover, since the wavelength dependence is totally different from the distribution characteristics of the spectral luminous efficiency, it is difficult to perform control to suppress fluctuations in the white balance caused due to wavelength fluctuations using the output of the optical sensor 9.

Therefore, such a configuration is provided in which the temperature sensor 10 detects the temperature of the laser light source 5 and a correction coefficient is multiplied on the lasers according to the temperatures of the lasers.

Figure 7:
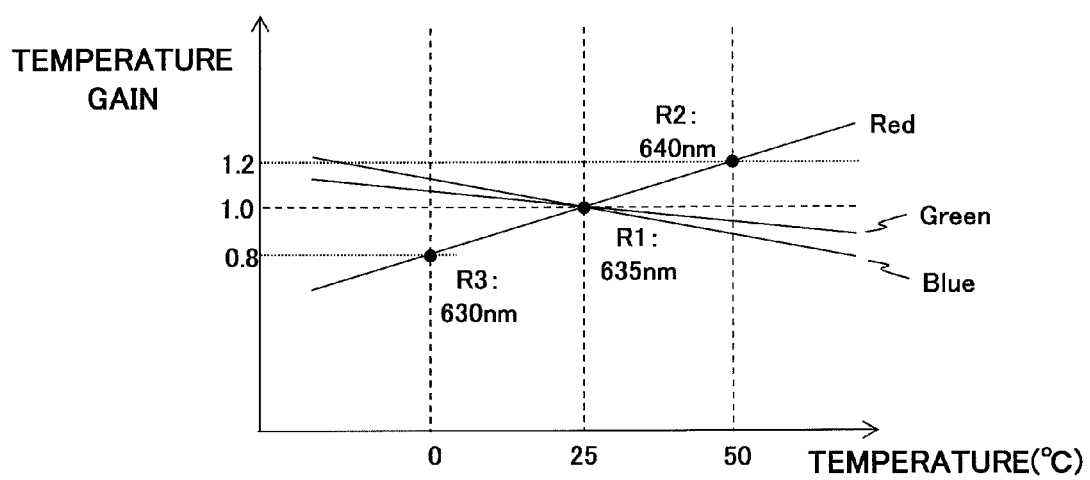
FIG. 7 is a characteristic diagram of the characteristics of the temperature gain and the temperature according to the embodiment.

FIG. 7 is a characteristic diagram of the characteristics of the temperature gain and the temperature in the embodiment, and is a diagram of the temperature characteristics of the spectral luminous efficiency. In the illustration, in the case of the red laser, for example, since the brightness is increased by 20% at a temperature of 0° C. due to wavelength fluctuations, a coefficient 0.8, which is a coefficient reduced by 20%, is multiplied at the gain circuit 41 of the laser driver 4 in order to perform reverse correction. On the contrary, since the brightness is reduced by 20% at a temperature of 50° C., coefficient 1.2, which is a coefficient increased by 20%, is multiplied at the gain circuit 41 of the laser driver 4 in order to perform reverse correction. Linear interpolation is performed in which a coefficient 1 at a temperature of 25° C. at room temperature is the center axis for the coefficients between the coefficient 0.8 and the coefficient 1.2, so that the red laser is controlled at the gain circuit 41 of the laser driver 4 based on a correction coefficient line as illustrated in FIG. 7. Similarly in the green and blue lasers, the green and blue lasers are controlled at the gain circuit 41 of the laser driver 4 based on the correction coefficient line±7% for the green laser, and on the correction coefficient line±10% for the blue laser.

Moreover, the green and blue lasers have the slope of the spectral luminous efficiency on the opposite side of the red laser, and such characteristics are observed in which the brightness is reduced at a temperature of 0° C. and the brightness is increased at a temperature of 50° C., so that the slope of the correction coefficient line is a negative slope different from the correction coefficient line of the red laser as illustrated in FIG. 7.

However, the slope of the correction coefficient line illustrated in FIG. 7 is an example. The amount of fluctuations in the wavelength caused due to the temperature is different even in the same colors because of individual differences in the lasers, the materials, the structures, and so on. Therefore, it is necessary that characteristics be acquired individually for the lasers and the correction coefficient lines be calculated and stored on the non-volatile memory 3.

It is noted that such a configuration may be possible in which in the case where there are both of the correction coefficients for laser wavelength fluctuations and the variations of the slope efficiencies ($L1 \times |1/\eta'-1/\eta|$, $L2 \times |1/\eta'-1/\eta|$) described in FIG. 2, the coefficients of them are multiplied by each other and the result is set to the gain circuit 41 of the laser driver 4.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:
1. An image display device that externally projects generated light and displays an image, the image display device comprising:
    a light source configured to generate the light;
    a light source drive unit configured to drive the light source and control a light quantity of the light;
    a reflecting mirror configured to reflect light generated at the light source and externally project the light, a direction to reflect the light being movable;
    a reflecting mirror drive unit configured to drive the reflecting mirror and control the direction to reflect the light;
    an image processing unit configured to process a first image signal inputted to the image display device, supply and control a second image signal for the image externally displayed to the light source drive unit, and supply a synchronization signal for the second image signal to the reflecting mirror drive unit;
    an optical sensor configured to measure a light quantity of light generated at the light source and supply a measured value to the image processing unit; and a temperature sensor configured to measure a temperature of the light source and supply a measured value to the image processing unit, wherein the image processing unit superposes a signal based on a first measured value of the light quantity measured at the optical sensor on the second image signal to be supplied to the light source drive unit in a state in which the light source drive unit is set to drive the light source at a set first temperature; and the image processing unit controls the light source drive unit so that a second measured value at a second temperature comes close to the first measured value at the first temperature as a target value based on the second measured value at which a light quantity of light generated at the light source is measured at the optical sensor at the second temperature different from the first temperature on the signal based on the first measured value.

2. The image display device according to claim 1, wherein the state in which the light source drive unit is set to drive the light source depends on a current value at which the light source drive unit drives a light source.

3. The image display device according to claim 2, wherein the first measured value at the first temperature and the second measured value at the second temperature are measured values of current values at two points at which the light source drive unit drives a light source.

4. The image display device according to claim 3, wherein the light source includes a red light source, a green light source, and a blue light source; and the image processing unit controls the light source drive unit so that the light source drive unit increases a current amplification factor of the red light source when a temperature of the red light source measured at the temperature sensor is increased, the light source drive unit reduces a current amplification factor of the green light source when a temperature of the green light source is increased, and the light source drive unit reduces a current amplification factor of the blue light source when a temperature of the blue light source is increased.

5. The image display device according to claim 4, wherein the current amplification factor is set using a linear function for a light source temperature.

6. The image display device according to claim 1, wherein the light source includes a red light source, a green light source, and a blue light source; and the image processing unit controls the light source drive unit so that the light source drive unit increases a current amplification factor of the red light source when a temperature of the red light source measured at the temperature sensor is increased, the light source drive unit reduces a current amplification factor of the green light source when a temperature of the green light source is increased, and the light source drive unit reduces a current amplification factor of the blue light source when a temperature of the blue light source is increased.

7. The image display device according to claim 1, wherein the image processing unit superposes the signal based on the first measured value of the light quantity at a left end or a right end of a vertical blanking period of the second image signal, and reduces the first image signal so that the superposed signal does not overlap with an effective display region of the first image signal.

8. The image display device according to claim 7, further comprising a light shielding plate configured to shield light according to the signal based on the first measured value of the light quantity when the reflecting mirror externally projects the light.

9. The image display device according to claim 1, wherein the light source is a light source using a laser diode.

* * * * *